June 4, 1929.  G. DILLMAN  1,716,305
LAWN SPRINKLER
Filed Dec. 17, 1926   2 Sheets-Sheet 1
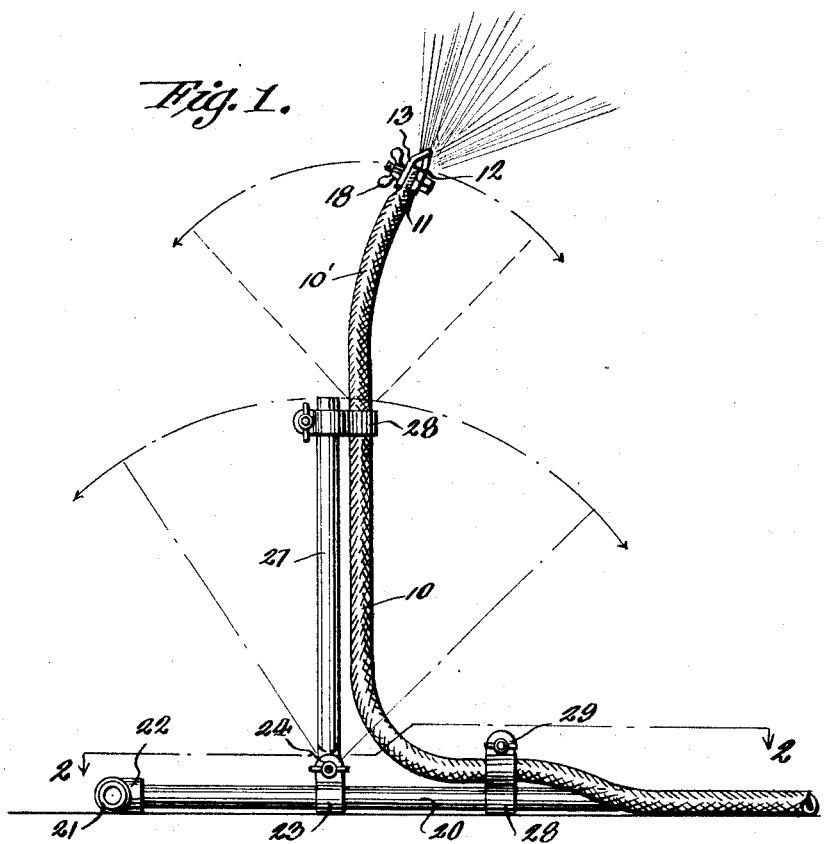
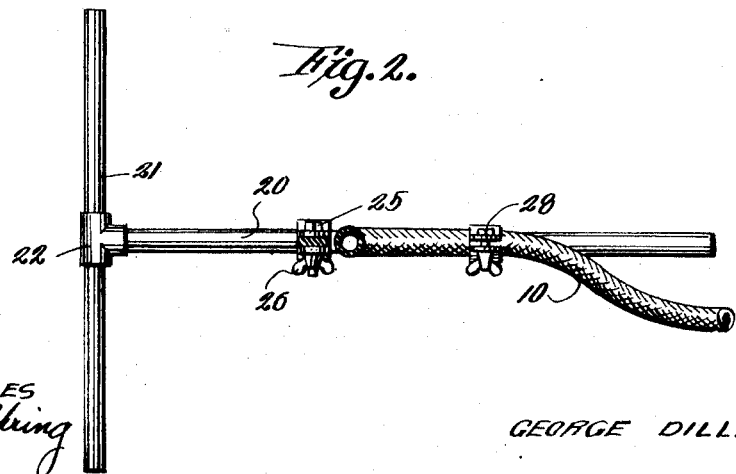
WITNESSES  
Inventor  
GEORGE DILLMAN  
By Richard B. Owen, Attorney June 4, 1929.  G. DILLMAN  1,716,305
LAWN SPRINKLER
Filed Dec. 17, 1926   2 Sheets-Sheet 2
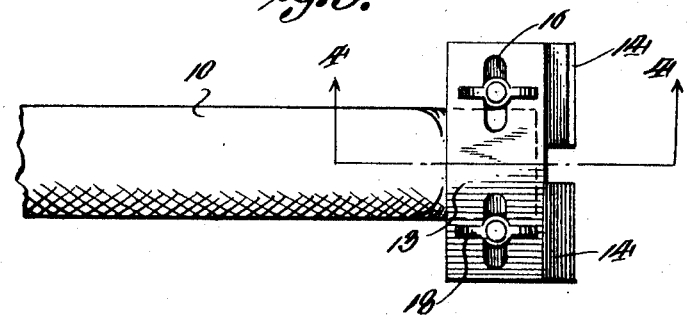
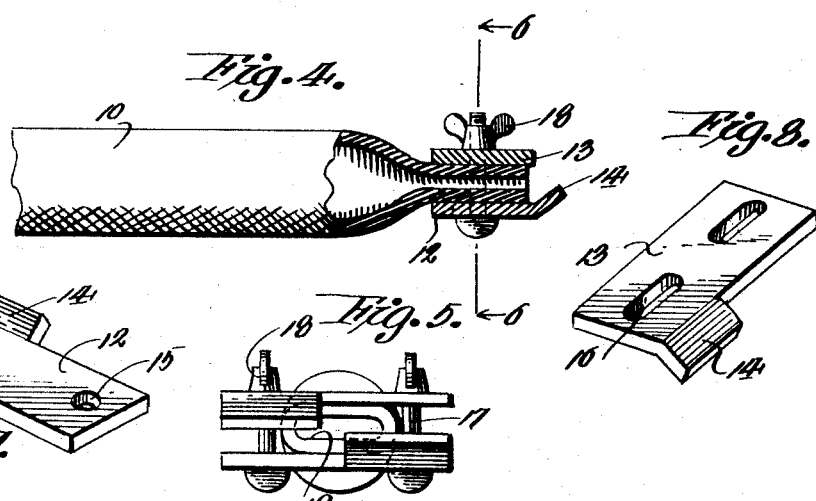
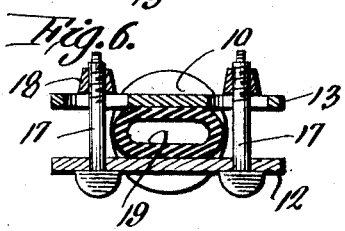
WITNESSES
Guy M. Spring
Inventor
GEORGE DILLMAN
By Richard B. Owen, Attorney Patented June 4, 1929.

1,716,305

UNITED STATES PATENT OFFICE.

GEORGE DILLMAN, OF RATON, NEW MEXICO.

LAWN SPRINKLER.

Application filed December 17, 1926. Serial No. 155,489.

The present invention relates to improvements in fluid sprinkling apparatus and has for its primary object to provide an apparatus adaptable for connection with a flexible fluid conducting hose for sprinkling trees and the like.

A further object of the invention is the provision of a sprinkling apparatus embodying a novel form of adjustable nozzle designed to properly spray the liquid as it is discharged from the outlet end of the hose.

Another object of the invention is the provision of a hose supporting structure arranged to adjustably support a hose in an upright position and arranged to permit proper direction of the fluid stream.

Still another object of the invention is the provision of a sprinkling apparatus of a simple and durable character and which can be manufactured at a relatively low cost.

Other objects and advantages of the invention will become apparent as the description progresses.

In the accompanying drawings forming a part of this specification and in which like reference characters are employed to designate corresponding parts throughout the same:

Figure 1 is a side elevational view of my improved sprinkling apparatus operatively associated with a fluid conducting hose, Figure 2 is a transverse sectional view taken on the line 2—2 of Figure 1, Figure 3 is an enlarged front elevational view of the nozzle structure in assembled position, Figure 4 is a transverse sectional view taken on the line 4—4 of Figure 3, Figure 5 is an end elevational view looking at the discharge end of the nozzle, Figure 6 is a transverse sectional view taken on the line 6—6 of Figure 4, Figure 7 is a perspective view of one of the nozzle sections, and Figure 8 is a similar view of the complimentary nozzle section.

With particular reference to the drawings, the numeral 10 generally designates a fluid conducting hose preferably formed of rubber or similar flexible material. One end of the hose 10 preferably carries an attaching structure designed for connection with the valve of a water or other liquid supply pipe.

The opposite end of the hose 10 carries a nozzle generally indicated at 11. In the present instance, this nozzle embodies a pair of complementary nozzle sections 12 and 13. Each of the sections is in the form of an elongated rectangular plate having a lip 14 formed at its outer longitudinal edge. Each of the lips 14 is disposed adjacent one end of the section plate and form the continuation of the plate structure, the lips being bent at an acute angle with respect to the plane of the body plate. The section 12 is formed with a pair of spaced circular openings 15 while the complementary plate 13 is formed with a pair of elongated slots 16 adapted to register with the openings 15 in the assembled position of the plates.

An essential feature of my present nozzle construction is embodied in the extremely simple and convenient connection upon the discharge of the hose 10. As clearly shown in the drawings, the nozzle sections 12 and 13 are arranged in opposed positions on each side of the hose at its discharge end. A pair of bolts 17 are extended through the openings 15 and slots 16 and adjustably secured in position by wing nuts 18. By adjusting the wing nuts 18, the plates may be tightly secured on the hose to compress the end portion of the hose to form an elongated opening as indicated at 19. As shown to advantage in Figure 5, the lips 14 formed on the complementary sections will be disposed in diagonally opposed positions and normally spaced at the inner adjacent ends. The section 13 may be slidably adjusted laterally of the hose to vary the space between the inner adjacent ends of the lips 14 to vary the sprinkling effect of the nozzle.

In use, as the liquid is forcibly discharged through the outlet end of the hose 10 the elongated formation of the discharge end will tend to form an elongated jet. The end portions of the liquid jet will strike the angular inwardly directed lips 14 of the nozzle so as to deflect the stream in an angular direction. Thus, a portion of the liquid stream will be directed in one angular direction while the opposite portion will be directed in the opposite direction, the intermediate or central portion issuing in a straght forward jet. By slidably adjusting the nozzle section 13 the central jet may be increased or reduced to provide a desirable spraying effect.

Another feature of the present invention resides in the provision of a simple and efficient hose supporting apparatus designed to support a portion of the hose in an elevated position at any suitable angular inclination. This support apparatus embodies a T-shaped support frame composed of a longitudinal bar pipe section 20 and a transversely extending section 21 secured to the forward end of the section 20 by means of a T fitting 22. The sections 20 and 21 are arranged in a horizontal plane and are to be positioned on the ground.

Adjustably secured to the longitudinal section 20 is a frame bracket 23 embodying a body portion of substantially circular formation having apertured ears 24 formed at its ends. The body of the bracket 23 is adapted to be positioned about the section 20 while the apertured ears 24 engage a transversely extending bolt 25 threaded at its outer end and carrying a wing nut 26.

Pivotally connected with the bracket 23 is an adjustable supporting arm 27 having its lower end flattened and inserted between the apertured ears 24 and formed with an opening adapted to align with the openings in the ears. The bolt 25 is extended through the apertured ears and opening in the lower end of the arm 27 for pivotal connection of the arm. Thus, it is readily apparent that the supporting arm 27 may be swung laterally of the longitudinal section 20 by loosening the wing nut 26 so that the bracket may be rotated about the section. The supporting section 27 may also be longitudinally adjusted by swinging the section about the bolt 25 of a pivot.

A pair of hose attaching brackets 28 are formed so as to detachably secure the hose to the horizontal section 20 and the upwardly extending support arm 27. These brackets embody a substantially U-shaped bar having its upper and lower portions formed in a substantially cylindrical arrangement to embrace the hose 10 and the support sections. The ends of the brackets 28 are formed with apertured ears 29 through which the adjusting bolts are mounted.

One of the brackets 28 is secured about the horizontal support section 20 and embraces a horizontal extension of the hose 10. A second bracket 28 is secured adjacent the outer end of the support arm 27 and supports the hose in a position substantially parallel with this section. By adjustment of the supporting arm 27, the outlet end of the hose may be directed in any suitable position to direct the liquid spray upon trees or the like. As shown in Figure 1, the end portion of the hose may be extended beyond the upper bracket 28 to provide a flexible independently adjustable portion 10' to permit the manual flexing of the portion for the more accurate direction of the liquid jet.

From the foregoing description and the drawings it will be noted that an extremely simple and efficient sprinkling apparatus has been provided, designed to produce a simple and efficient spraying nozzle and a support stand for securing a flexible conducting hose in proper position for continuous sprinkling.

It is to be understood that the form of my invention herewith shown and described is to be taken as the preferred example of the same and that various changes as to the shape, size and arrangement of parts may be resorted to without departing from the spirit of the invention or the scope of the subjoined claims.

Having thus described my invention, I claim:

1. A spraying nozzle including a pair of complementary sections, each section including an elongated plate and a forwardly projecting lip formed adjacent one end of the plate and bent inwardly, the said sections being assembled in opposed positions on the end of a hose and the lips arranged in diagonally opposed positions, means for detachably connecting the said sections and laterally adjusting the position of one section with respect to the opposed section.

2. A nozzle forming device for flexible hose, comprising a pair of complementary relatively flat elements designed to be arranged in face opposed relation with a hose end therebetween, means for moving said plates relative to one another to act upon the interposed hose end, and means carried by the plates at their forward longitudinal edges and at an angle thereto for deflecting a stream of water issuing from the hose.

3. A nozzle forming attachment for application to the end of a flexible hose, comprising a pair of elongated rectangular plates designed to be arranged in face opposed relation with the hose end positioned therebetween, means connecting the ends of said plates for drawing the same together to compress the interposed hose end, deflector elements extending from the forward longitudinal edges of the plates at an angle thereto to deflect fluid issuing from the hose, and means whereby said deflector elements may be shifted relative to one another substantially as described.

4. A nozzle forming attachment for a flexible hose comprising a pair of flat elongated rectangular plates designed to be arranged in face opposed relation on opposite sides of a hose end, one of said plates being provided adjacent each end with an aperture, the other of said plates being arranged adjacent to each end with a longitudinally extending slot, bolts extending through said apertures and slots, thumb nuts on said bolts for engaging one of said plates, and deflector elements extending from the forward longitudinal edges of the plates at an angle thereto, to deflect fluid issuing from the hose.

In testimony whereof I affix my signature.

GEORGE DILLMAN.